Sept. 15, 1953
E. H. WILLETTS
IRRIGATION APPARATUS
2,652,282
Filed Oct. 21, 1949
3 Sheets-Sheet 1
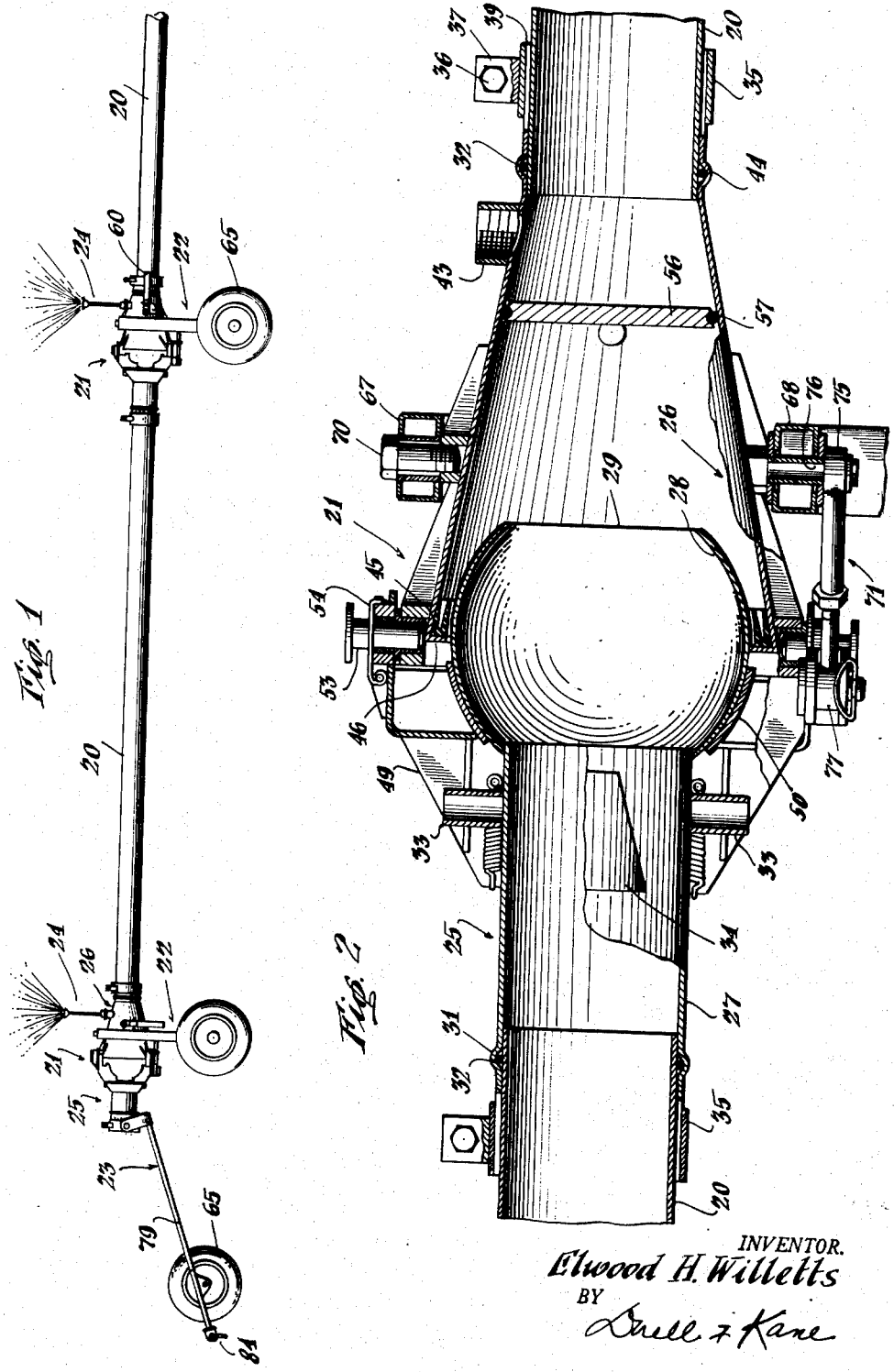
INVENTOR.
Elwood H. Willetts
BY
Drull & Kane
ATTORNEYS

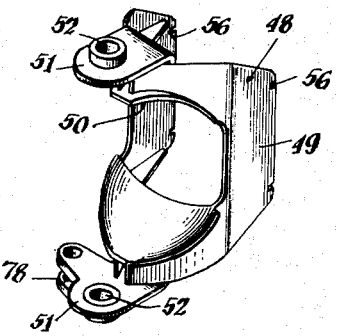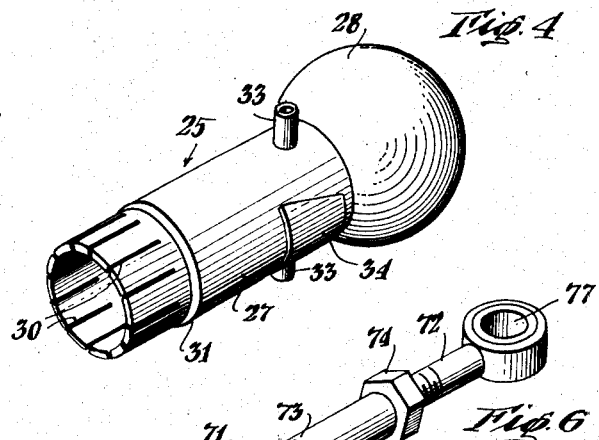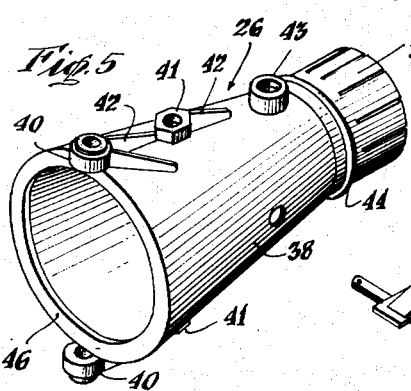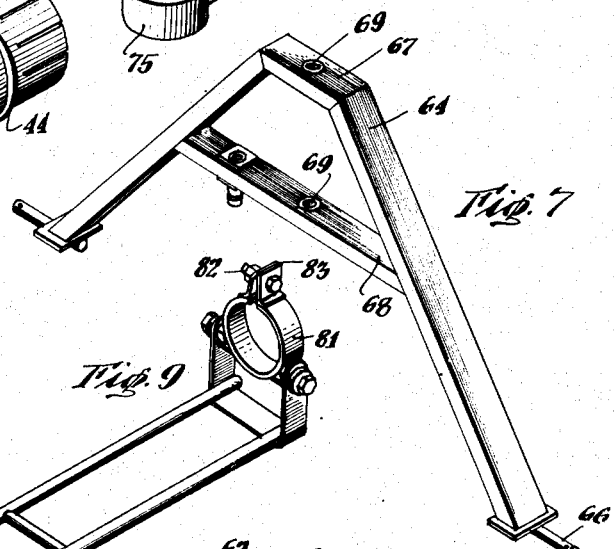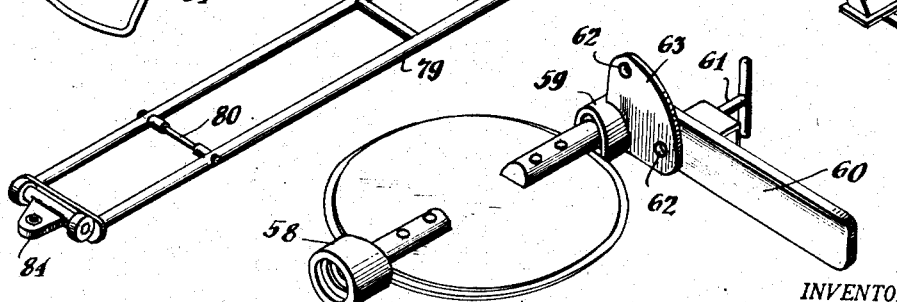

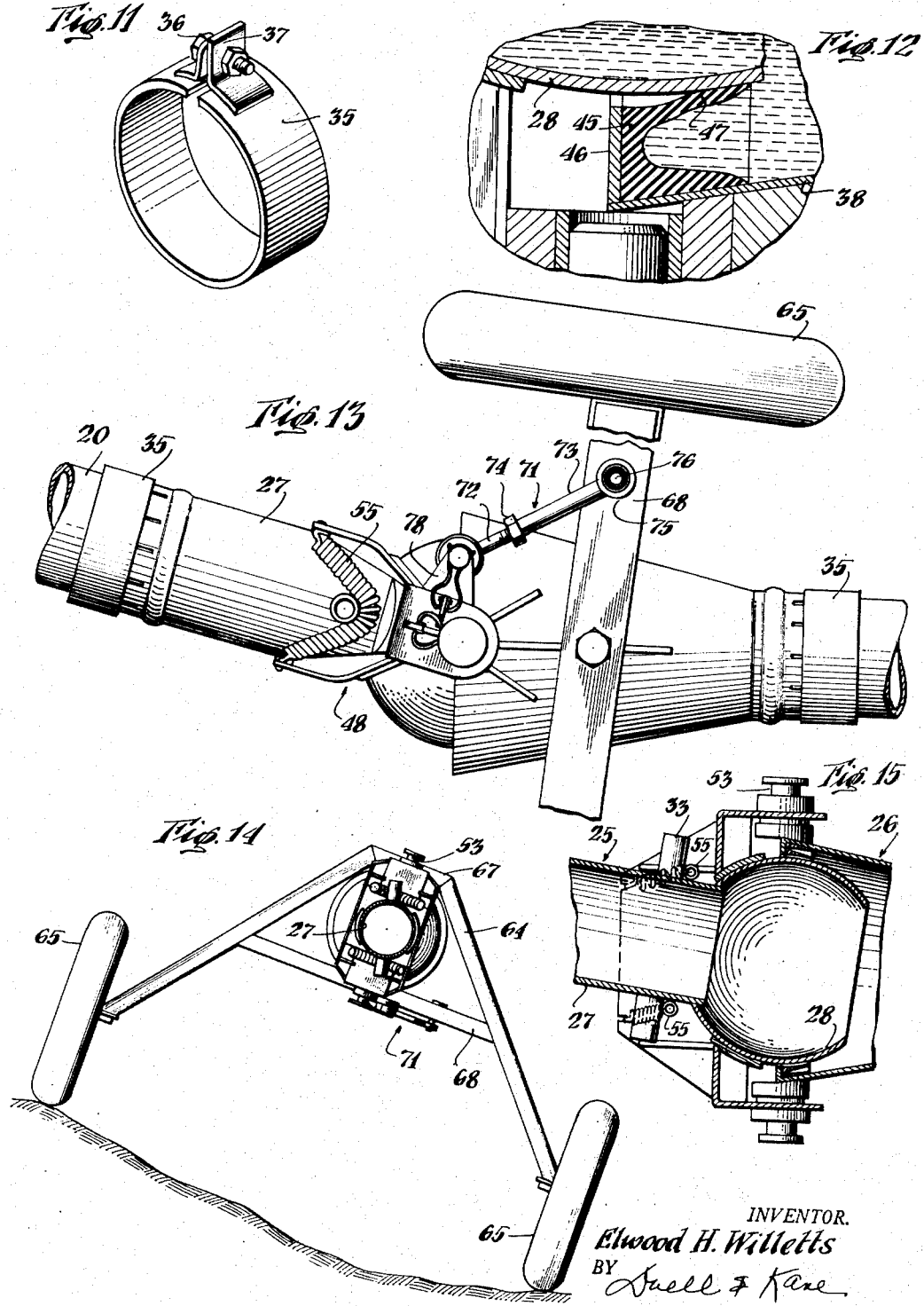

Patented Sept. 15, 1953

2,652,282

UNITED STATES PATENT OFFICE 2,652,282

IRRIGATION APPARATUS

Elwood H. Willetts, Douglaston, N. Y.

Application October 21, 1949, Serial No. 122,641

6 Claims. (Cl. 299—47)

This invention relates to improved irrigation apparatus of the portable or movable sprinkler type.

It is an object of the invention to provide irrigation equipment of this type which is relatively simple and inexpensive to manufacture and assemble, which can be conveniently towed from place to place without dismantling and while in assembled condition, after towing, is immediately ready for use without any complicated assembling, adjustments or changes.

In many agricultural areas it is necessary to irrigate the land in order to grow crops in a satisfactory manner. Also, it has become recognized that it is desirable to irrigate many other areas in order to obtain improved or a larger crop yield. The expense of a permanent irrigation pipe installation is considerable, and under many circumstances it is desirable to provide a movable or transportable irrigation system that can be shifted from one sprinkling location to another. The movable or transportable systems heretofor proposed have had recognized disadvantages.

In many instances it has been necessary to dismantle the system before moving it and then to re-assemble it at the new location which is clumsy, inconvenient and expensive and consumes considerable time.

My present invention contemplates overcoming the prior disadvantages by mounting a pipe irrigation system upon wheels in an improved manner so that the system is relatively inexpensive to manufacture and assemble and which, when assembled, can be towed from place to place and used without dismantling and then re-assembling. Any joint in the line of my irrigator may be connected or disconnected by simply inserting or removing its spring retained hinge pins.

My improved irrigation apparatus is also designed and arranged so that the wheels of the supporting carriages will follow in substantially the same path as the wheels of the leading carriages, even in a relatively long system, so that the apparatus can be readily towed in either direction with minimum damage to crops and through narrow winding trails and paths.

My apparatus also embodies an improved automatic valve arrangement whereby the system automatically drains when the water pressure is cut off and automatically reseals itself when the pressure is re-established.

Another advantage of my invention is the location of a shut-off valve in the enlarged portion of the joint where restriction of normal flow is avoided.

Other objects and advantages will be apparent from the following detailed description of the drawings in which—

Fig. 1 is a side elevation of a portion of an irrigation system embodying my invention;

Fig. 2 is a detailed view partially in section and partially in elevation of one of the joint assemblies in the system together with the related cooperating parts;

Fig. 3 is a perspective view of a yoke used in the joint assembly;

Fig. 4 is a perspective view of the male portion of the ball joint assembly;

Fig. 5 is a perspective view of the female portion of the ball joint assembly;

Fig. 6 is a similar view of the steering or guiding rod;

Fig. 7 is a similar view of the carriage frame used for supporting the irrigation system;

Fig. 8 is a detailed view of the pin retaining spring;

Fig. 9 is a perspective view of the frame of the tail assembly;

Fig. 10 is a detailed view in perspective of the cut-off valve used in each of the joint assemblies;

Fig. 11 is a perspective view of the clamping ring used in assembling the joint members with the pipes;

Fig. 12 is a detailed view in section of the automatic draining and sealing valve used in the joint assembly;

Fig. 13 is a plan view from the under-side of the ball joint assembly and related parts showing the manner in which the parts may pivot in a horizontal plane with respect to each other;

Fig. 14 is a view partially in cross section and partially in elevation showing one of the carriages disposed at an angle and showing the manner in which the ball joint assembly permits the parts to turn or rotate with respect to each other; and Fig. 15 is a detailed sectional view of the ball joint assembly showing the manner in which the parts may pivot in a vertical plane with respect to each other when going over irregular terrain.

Referring more particularly to Fig. 1, my improved movable or transportable irrigation apparatus comprises a plurality of pipe lengths 20 connected together by joint assemblies 21 which, in turn, are mounted upon wheeled carriages 22. Both ends of the system are provided with tail assemblies 23 (only trailing end is shown). The span of the pipes between the carriages is preferably unsupported as shown. The system is provided, preferably at the joint assemblies, with suitable shower or nozzle heads 24 which may be of conventional design and through which the water is sprayed upon the adjoining land. The apparatus may be transported by being drawn by a tractor or other vehicle and when it has been moved to the desired location it is connected to a source of water under pressure so that the water is then sprayed on the land. When the pressure is shut off the pipes drain completely through each joint, reducing the weight to be moved so the apparatus may be readily transported over the wet ground without being dismantled and while in assembled condition, and it is immediately ready for use after it has been moved from one location to another.

The pipes 20 may be of any desired type. For reasons of economy, I prefer to use standard commercially available pipe. For this purpose unflanged aluminum pipe serves very satisfactorily because it is light in weight and can be readily assembled with my improved joint members 21.

The joint assemblies 21 as shown most clearly in Figs. 2, 4 and 5 comprise a male ball joint member 25 and a cooperating female joint member 26. The male member 25 is formed with a sleeve 27 whose internal diameter corresponds generally with the outside diameter of the pipes 20 to be assembled therewith. Suitably secured to one end of the sleeve is an enlarged ball portion 28 open at the outer end 29 as shown. The opposite end of sleeve 27 is provided with a plurality of longitudinal slots 30 extending inwardly from the end thereof a short distance so that the end of the sleeve is in the form of a contractable and expansible collar. The sleeve 27 is also preferably provided with a circumferentially extending bead 31 immediately adjacent the expansible and contractable collar portion and serves to accommodate a sealing ring 32 made of rubber, neoprene or some similar material.

Projecting at a vertical direction from the top and bottom of the sleeve 25 adjacent the ball portion 28 are the tubular standards or posts 33 which serve to retain a connecting yoke in place as will be later explained. The two sides of the sleeve adjacent the ball portion 28 are provided with wear shoes 34 which taper towards the ball portion and which serve to receive the brunt of the friction or wear from the yoke portion as will be later explained.

The male ball joint member 25 is assembled with the pipe 20 in the manner shown in Fig. 1 by inserting the end of the pipe 20 through the contractable collar portion into the sleeve portion 25 to a position extending beyond the sealing ring 32. A split clamping band or ring 35 is first assembled around the collar portion of the sleeve and then tightened to clamp the parts in place by means of a nut and bolt 36 extending through flanges 37 at the two ends of the band.

The female clamping member 26 consists of a tapered or truncated conical body portion 38 formed with a contractable cylindrical collar portion 39 at a small end thereof corresponding in size and structure with the collar portion formed on the end of sleeve 25. The large end of the tapered member 38 is large enough to accommodate the ball member 28.

Near the open end of the conical portion, in vertical alignment with each other, are the pivot brackets 40 having sockets formed therein to which a yoke member is pivotally connected for holding the joint members in assembled relationship. Spaced a short distance from the pivot brackets 40 are a pair of lugs 41, also in vertical alignment with each other having threaded openings formed therein and which serve to connect the carriage frame to the system. The structure may be reinforced around the members 40 and 41 by means of ribs 42 as shown.

On the upper surface of the conical portion adjacent the collar 39 I provide the internally threaded collar 43 which extends completely through the female joint member so as to provide connection between the inside and outside thereof. The collar 43 serves to receive the sprinkler or nozzle head 24.

As in the case of the male ball joint member a bead 44 extends circumferentially around the member adjacent the contractable collar 39 and serves to accommodate a sealing ring 32. (See Figs. 2 and 5.)

The joint member 26 is assembled with a pipe in a similar manner to the member 25 by inserting the end 20 of the pipe therein until the end of the pipe projects beyond the seal 32. The clamping band 35 is then tightened around collar 39 so as to clamp the parts in assembled relationship.

When the joint members have been assembled with the pipe sections the joints are assembled together by inserting the ball portion 28 inside the conical portion 38. As viewed in Fig. 2 the water may then flow from the pipe 20 at the right side of the figure through the conical portions thence through the open end of the ball 28 through the male ball joint member thence into the pipe 20 at the left side of Fig. 2.

So as to prevent undue leakage around the joints when water under pressure is flowing therethrough and so as to permit the system to quickly drain when the pressure is cut off, I provide a novel type of sealing gasket or washer shown most clearly at 45 in Figs. 2 and 12. This gasket may be made of rubber or neoprene and is circular in shape fitting snugly around the inside of the conical portion 38 at the open end thereof and held in place by means of inturned flange 46. The gasket is generally U-shaped in cross-section having two generally parallel flanges 47 depending from a backing portion or base. The open side of the gasket faces inwardly. Normally when the ball portion 28 is disposed in the conical socket portion 38 there is a space between the gasket and the ball surface so the adjoining pipes may change their positions about the centerline of the joint without contact between the gasket and the ball. When water under pressure is forced through the system the inner flange of the gasket is distorted inwardly into contact with the ball surface as shown in Fig. 12 providing a protective seal against leakage. As the pressure increases the seal becomes tighter and more effective. When the pressure is shut off it is desirable that the pipes drain so that they will be lighter and therefore easier to transport over the wet ground and it will be appreciated that shutting off the pressure results in the flange assuming its normal position as shown in Fig. 2 and that substantially all of the water may quickly drain from the system. The open face of the gasket, it should be noted, is located between the major diameter of the ball and the open face thereof, thereby insuring better sealing when the pressure is turned on.

When the ball portion 28 is inserted in the conical socket the respective pipe sections may have relative torsional movement with respect to each other and may also pivot vertically and horizontally within limits with respect to each other. This movement is desirable in transporting the system from location to location and in using the apparatus where the terrain is irregular. For this reason, I provide improved mechanism for holding the ball joint in assembled relationship while still permitting this relative movement between the parts. This mechanism comprises a yoke 48 shown most clearly in Figs. 2 and 3. The yoke is assembled around the ball end of the joint member 25, before the ball is attached to the sleeve or before the standards 33 are secured in place. It consists of a pair of side plates 49 straddling the two sides of the sleeve 27 and supporting the shoes 50 near the upper and lower ends thereof. The curvature of the shoes corresponds with the curvature of ball 28 and normally rest on the upper and lower surfaces thereof. Projecting forwardly from the top and bottom of the yoke 48 are a pair of aligned brackets 51 having sockets 52 extending therethrough. The brackets 51 are arranged so that the sockets rest upon the pivot members 40 and the parts can then be assembled together by means of pivot pins 53 held in place by locking springs 54. It will thus be seen that the yoke may rotate in a horizontal plane with respect to the female joint member 26 thus permitting relative horizontal pivoting between the pipe sections.

The yoke 48 merely straddles the end of the male joint member and is held in place with respect thereto in an improved manner so as to avoid backlash yet permit limited torsional movement and vertical pivoting. For this purpose I provide a pair of elongated helical springs 55 which connect between the upper and lower ends respectively of the side plates 49 and are held in position by engagement with slots 56. The springs are extended around the forward side of the standards 33 and exert force upon the yoke in a forward direction to center the yoke and normally held it in position. This permits relative torsional movement in the manner shown in Fig. 14 since the yoke may rotate with respect to its male joint member 25 with the standards shifting their relationship with respect to the springs. In this way the apparatus may be used on irregular terrain without strain or damage to the parts. The bit between the yoke and male joint member is such as to prevent pivoting between these parts in a horizontal plane and the springs serve to prevent longitudinal separation between the male and female portions or "backlash."

Also, as shown in Fig. 15 the yoke and joint assembly permits the pipe sections to pivot with respect to each other to a limited extent in a vertical plane. Thus the male joint member may pivot in a vertical plane with respect to its yoke and the springs will accommodate themselves to the new relationship. However, the force exerted by the springs serves to re-adjust the parts to their proper relationship when the pipe sections are again disposed in a horizontal plane.

I have found that it is desirable to provide a suitable cut-off valve mechanism for shutting off the water at or near the end of any pipe section. This can be conveniently accomplished by means of the valve structure shown most clearly in Figs. 2 and 10. The valve takes the form of a butterfly valve 56 having a sealing ring 57 around the periphery thereof. The valve is disposed in the conical socket of the female joint member and is of a size to completely shut off the passage thereof. It is pivotally mounted at one side of the socket portion by means of the journal members 58 and 59 and is operated by a handle 60 on the outer surface thereof. When the handle 60 is disposed in vertical position the valve is closed and when it is in horizontal position it is open. A small locking handle 61 engageable with the openings 62 in plate 63 serves to retain the valve in either open or closed position.

The location of the valve in the conical section of the female joint member where the cross sectional area exceeds the sum of the free area of the line pipe plus the obstructional area of the valve in its open position avoids the usual restriction of flow obtaining through normal sized valves of more expensive construction.

As previously stated my system is preferably supported on wheeled carriages. Each carriage preferably consists of a frame 64 in the form of the letter A pivotally connected for horizontal turning movement to the joint assembly and having wheels 65 supported on axles 66 at the lower end thereof. The top of the A frame is provided with a crossbar 67 and spaced a short distance therebelow is a cross brace 68. The members 67 and 68 have centrally disposed sockets 69 extending therethrough in alignment with each other. These sockets are adapted to receive the pivot bolts 70. It will be seen that the ends of the pivot bolts are threaded and they are secured into the threaded socket members 41 while the upper portion of the pivot bolts are unthreaded and are fitted into the unthreaded sockets 69. Due to this arrangement, the carriages may pivot or rotate in a horizontal plane with respect to the female joint member 26.

When the apparatus is shifted from location to location, it is towed from either end thereof and it is desirable that the trailing carriages follow in substantially the same tracks as the leading carriages. I have found that this can be accomplished by controlling the steering of the carriages so that the angle between the carriage and the pipe section immediately preceding or immediately following it is half the angle between the two pipe sections. This is accomplished by means of a steering rod or link 71 connected between the carriage and the joint assembly. The rod is formed of two telescopic sections 72 and 73. The section 72 being threaded into the section 73 and being provided with the nut 74 for holding the parts in adjusted position. At one end the rod is provided with an eye-piece 75 which is pivotally connected to the cross brace 68 of the A frame at a point 76 to one side of the center thereof. The opposite end of the rod is also provided with eye-piece 77 which is pivotally connected between the bracket arms 78 projecting laterally from one side of the yoke 48. The length of the rod 71 is adjusted so that normally when the pipe sections 20 are disposed in a straight line the carriage frame 64 is disposed transversely at right angles thereto. As the pipe sections are pivoted horizontally with respect to each other, the steering rod shifts the A frame to a position where the angle of the A frame to either of the pipe sections is substantially one-half the angle between the two pipe sections.

In assembling an irrigation system embodying my invention, any number of pipe sections may be connected together by means of the ball joint assemblies 21 mounted upon carriage 22 and the sprinklers or fittings 24 of the desired type are secured in place. The first and last pipe sections in the system are provided with a complete ball joint assembly 21. However, instead of being connected to another pipe section the end joint assemblies are each connected with a tail wheel carriage 23. The tail wheel carriage takes the form of a frame 79 having an axle 80 which supports a wheel 65 at its lower end. The upper end of the tail carriage frame is provided with a split clamping band 81 corresponding in structure to the band 35. The clamping band is clamped around the collar of the end joint member 25 or 26 in the same manner as band 35 by means of nut and bolt 82 received in flanges 83. The outer end of the tail carriage 79 is provided with a hinged connecting link 84 by means of which the carriage serves as a drawbar for the forward end of the line when it is lifted off the ground to the towing connection on the truck.

In assembling the device each joint section is first assembled with its respective joint members i. e., a male member is connected to a female member after the carriage frames have been assembled with the female joint members and prior to securing the pipe section thereto. When the desired number of sections have been assembled together with a carriage at each joint assembly, the tail assembly carriages are secured thereto. The system may then be transported by being towed by a tractor or other vehicle to the desired location. As it is towed, the trailing carriages will follow in the tracks of the leading carriages due to the steering rod assembly. Due to the ball joint assembly together with the yoke 48 the sections may pivot horizontally as the system steers or turns as shown in Fig. 13 or the respective sections may have limited torsional movement with respect to each other, as the carriages pass over irregular terrain as shown in Fig. 14. Also, as the apparatus travels uphill and downhill the sections may pivot vertically with respect to each other in the manner shown in Fig. 15. The end carriage is steered by the tail wheel assembly.

When the apparatus has been moved to the desired location, the leading joint is connected to a pump or other source of water under pressure. The water passing through the system under pressure forces the gaskets 45 to seal the joints in the manner shown in Fig. 12. Since the final butterfly valve is closed as shown in Fig. 1, the water in the system will be sprayed outwardly through the spray nozzles or heads. When the water pressure is shut off the gasket or washer then assumes the position shown in Fig. 2 with the result that the water in the system may drain outwardly onto the ground. This eliminates the weight of water from the apparatus and it may then be towed over the wetted ground without dismantling to another location where it is immediately ready for use without reassembling or any adjustments or alterations. If the entire length of the system is not required for any particular location, the butterfly valve at the end of the required section may be shut off and the remainder of the system either left in place or disconnected as desired. If additional length is required, the tail assembly may be readily removed and additional pipe sections added thereto by means of the spring retained hinge pins. It will be appreciated that while I have illustrated one embodiment of my invention, modifications may be made without departing from the spirit of the invention as set forth in the accompanying claims. Thus the specific type of joint may be varied and the location of the carriages may be changed.

I claim:

1. Irrigation apparatus comprising a plurality of pipe sections, hydraulic joint members having contractable sleeves fitted over the ends of the pipe sections and having releasable clamping means for contracting the sleeves and thereby securing them to the pipe sections, one of said joint members having a truncated, conical portion of greater diameter than the pipe section and having a shut-off valve located therein, means for releasably connecting adjacent joint members together so as to permit limited pivoting of the pipe sections relative to each other and wheeled carriages pivotally connected to certain of the joint members and being free from any rigid connection with the joint members to which they are pivoted for supporting the apparatus so that it may be steerably towed in either direction from place to place while assembled.

2. Irrigation apparatus comprising a plurality of pipe sections arranged in a pipe line, male and female hydraulic ball and socket joint members connecting adjacent ends of the pipe sections together, said ball and socket joint members having a narrow circumferential space between them, a self-draining and self-sealing gasket in the space between the joint members comprising a circular member made of resilient material, the normal thickness of the gasket being less than the space between the joint members but being expandable under a pre-determined pressure to seal the space between the members and wheels for supporting the apparatus pivotally connected thereto for steering.

3. Irrigation apparatus comprising a plurality of pipe sections arranged in a pipe line, said pipe sections being of uniform cylindrical shape throughout their entire length and being free from flanges, projections or grooves at the ends thereof, a hydraulic ball joint member and a hydraulic socket joint member each provided with contractable sleeves in engagement with adjacent ends of a pair of pipe sections and held in place by releasable clamping means in clamping engagement with the sleeves, means for holding the ball joint member in engagement with the socket member comprising a yoke having pivotal engagement with one joint member so as to provide for pivotal movement in one plane and engaging and loosely straddling the other joint member so as to provide for limited torsional movement and limited pivotal movement in another plane while preventing relative movement lengthwise of the pipe and joint member on which it is mounted, and a carriage having wheels thereon connected around one of the joint members by vertical pivot means so that the carriage may steer in a horizontal plane, said carriage being free from any rigid connection therewith.

4. In a movable irrigation system a pair of pipe sections, means for connecting the pipe sections together in end to end relationship so that they may pivot with respect to each other in a horizontal plane, a wheeled carriage having pivotal connection to one of the pipe sections adjacent the other pipe section and being free from any rigid connection with the first pipe section so that it may steer in a horizontal plane with respect thereto, and steering control means connected between the carriage and the other pipe section so that the carriage is disposed in a transverse position when the pipe sections are arranged in a straight line but which controls the steering of the carriage so that the angle of the carriage to either pipe section is approximately one-half of the angle between the two pipe sections.

5. Irrigation apparatus of the type set forth in claim 4 in which the steering control means comprises a link pivotally connected adjacent one end to the carriage at a point spaced laterally from the center thereof and having means pivotally connecting the other end thereof adjacent the end of the other pipe section.

6. Irrigation apparatus comprising a plurality of pipe sections, hydraulic joint members connected to the ends of the pipe sections and connected together so that the pipe sections may have limited pivotal movement in a horizontal plane, and a carriage having ground engaging wheels supported on a substantially A-shaped frame connected by vertical pivots to one of the joint members and being free from any rigid connection therewith so that the carriage may steer with respect thereto and means for controlling the steering in the form of a steering rod pivotally connected adjacent one end to the frame of the carriage at a point spaced laterally from the center thereof and pivotally connected adjacent its other end to the other joint member.

ELWOOD H. WILLETTS.

References Cited in the file of this patent

UNITED STATES PATENTS

| Number | Name | Date |
|---|---|---|
| 1,429,756 | Mitchell | Sept. 19, 1922 |
| 1,601,199 | Clapper | Sept. 28, 1926 |
| 2,443,272 | Sagen | June 15, 1948 |
| 2,459,389 | Newman | Jan. 18, 1949 |
| 2,516,711 | Mansur | July 25, 1950 |